United States Patent Office 3,539,444
Patented Nov. 10, 1970

3,539,444
DECORATIVE SHEET COMPRISING PAPER IMPREGNATED WITH A COPOLYESTER AND HAVING A COVER LAYER OF POLYVINYL CHLORIDE
Ernst Schneider, Troisdorf, Bezirk Cologne, and Manfred Simon, Niederkasses, Germany, assignors to Dynamit Nobel Aktiengesellschaft, Troisdorf, Bezirk Cologne, Germany, a corporation of Germany
No Drawing. Filed Mar. 10, 1967, Ser. No. 622,101
Claims priority, application Germany, Mar. 15, 1966,
D 49,625
Int. Cl. B32b 27/36
U.S. Cl. 161—232                                     5 Claims

ABSTRACT OF THE DISCLOSURE

A paper impregnated with a copolyester of ethylene glycol and/or neopentyl glycol condensed with a mixture of terephthalic and isophthalic acids in a mol ratio of 70:30 to 30:70, which impregnated paper has a cover layer thereon of polyvinyl chloride which may be plasticized.

---

This invention relates to the production of decorative, impregnated paper sheets suitable for lamination to wool or other substrate surfaces. This invention further refers to such laminated product.

The impregnation of paper with thermosetting plastics such as urea formaldehyde, melamine formaldehyde and phenolformaldehyde resins is in the prior art. Papers impregnated with such precondensed resins, however, have certain disadvantages. They have a limited storage life and, after they are pressed onto wood, they must be vernished or lacquered, rubbed and polished to provide a suitable finish thereon, or else they have to be premanufactured at high cost and technical occupancy so as to require no further treatment.

It is an object of this invention to provide a novel impregnant for decorative paper sheeting.

It is another object of this invention to provide a novel impregnated decorative paper sheet.

It is a further object of this invention to provide a novel laminated wood-impregnated paper article.

Other and additional objects of this invention will become apparent from a consideration of this entire specification, including the claims appended hereto.

In accord with and fulfilling these objects, one aspect of this invention resides in a decorative paper impregnated with a polyester composed of either ethylene glycol, neopentyl glycol, or both, and as the acid component a mixture of terephthalic acid and isophthalic acid in a proportion of about 70:30 to 30:70 on a mole basis.

It is preferable to use polyesters which contain ethylene glycol radicals and neopentyl glycol radicals in a molar ratio of from 90:10 to 60:40.

The use of a copolyester which contains terephthalic acid radicals and isophthalic acid radicals in a ratio of 50:50 and has a reduced viscosity of 0.6 to 0.7 (1% solution of the copolyester in a 60:40 mixture of phenol and tetrachloroethane, measured at 25° C.) has proven particularly favorable.

The papers can be saturated by the immersion method or by spreading methods, or spreading methods can be used in such a manner that the paper surface on the reverse side is not entirely saturated, i.e., so that preferably 30 to 60% of the original paper surface is preserved. In the latter case, when the sheet materials are cemented to wood, the cement penetrates into the unsaturated paper surface. This has the advantage over full saturation of the papers in that the bond and hence also the edge strength of the sandwich is considerably improved. These sheets can be cut, sawed or drilled after cementing. Papers impregnated with the copolyesters are characterized by improved wet strength and laminar strength, and they have an unlimited storage file.

It is within the scope of this invention to provide a cover layer over the laminated impregnated paper. This cover layer may be polyvinyl chloride or a polyester as described above (as the impregnant of this invention). This cover layer may have plasticizer incorporated therein if desired. This cover layer may be laminated, fused or in other manner coated on said impregnated paper, e.g., doctoring, solvent coating, etc.

The polyvinyl chloride covering layers used for protection and for product improvement, etc. adhere so firmly to the copolyesters that no additional cement, such as normally has to be used in the lamination of polyvinyl chloride sheets, is required. The polyvinyl chloride or polyester sheets used can be applied by thermal activation by means of calendering, laminating and pressing apparatus. During the application, the desired surface can be produced by texturing the roll surface or by a subsequent embossing or texturing operation, thereby eliminating any special post-treatment of the laminate. Instead of a sheet, the granular product can also be used, which is fused and applied by rollers to the paper in the form of a film.

The impregnated sheet materials made according to the invention can be cemented to wood panels with commercial cements such as polyvinyl acetates, or, if they are provided with an additional coating of the above-named copolyesters on both sides and dried at 100 to 150° C., they can be pressed onto a board or panel without the need for a cement.

Ethyl acetate or a 1:1 mixture of methyl ethyl ketone and toluene or a 1:1:1 mixture of ethyl acetate, xylene and cyclohexanone can be used as solvents for the copolyesters. Chlorinated hydrocarbons such as trichloroethylene can also be used.

The following examples are illustrative of the practice of this invention without in any way being limiting thereon:

EXAMPLE 1

A printed decorative paper having a weight of 80 g./m.$^2$ is impregnated by brushing on one side with a 15% solution in ethyl acetate of a polyester which is composed of ethylene glycol radicals, neopentyl glycol radicals and terephthalic acid and isophthalic acid radicals, and which contains ethylene glycol and neopentyl glycol radicals in the molar ratio of 70:30 and terephthalic acid and isophthalic acid radicals in a molar ratio of 50:50, and is then dried.

Table 1 shows the wet strength of the impregnated papers, determined by measuring the tearing strength in the dry and wet state (after 2 hours of soaking in water).

TABLE 1

| Amount of copolyester applied, g./m.$^2$ | Wet strength, percent | |
|---|---|---|
| | Lengthwise | Crosswise |
| Not impregnated | 22 | 12 |
| 5 | 76 | 61 |
| 10 | 97 | 81 |

EXAMPLE 2

A paper impregnated by the spreading and immersion method and having a weight of 80 g./m.$^2$ is laminated at 140 to 150° C. to a transparent polyvinyl chloride sheet that is 100 microns thick and of a semi-hard consistency, and is then embossed.

Table 2 shows the measured resistance to peeling, which is a measure of the laminar strength, of papers impregnated with various amounts of copolyester and sealed with a polyvinyl chloride sheet 100 microns thick.

TABLE 2

| Amount of copolyester applied, g./m.$^2$: | Resistance to peeling, kg./cm. |
|---|---|
| Not impregnated | 0.125 |
| 5 | 0.22 |
| 10 | 0.32 |
| 20 | 0.38 |
| 37 | 0.45 |

It is apparent from the table that the laminar strength is improved as the amount of copolyester with which the paper is impregnated increases.

EXAMPLE 3

The paper impregnated as in Example 1 is laminated at 100 to 110° C. to a 50-micron-thick copolyester sheet which is composed of ethylene glycol radicals, terephthalic acid radicals and isophthalic acid radicals, and contains terephthalic acid and isophthalic acid radicals in a molar ratio of 60:40, and then is textured.

Table 3 shows that the impregnated papers sealed with the copolyester sheet has a still better laminar strength than those of the previous example which were sealed with polyvinyl chloride.

TABLE 3

| Amount of copolyester applied, g./m.$^2$: | Resistance to peeling, kg./cm. |
|---|---|
| Not impregnated | 0.075 |
| 5 | 0.475 |
| 10 | 0.735 |
| 20 | 0.9 |
| 37 | 0.96 |

EXAMPLE 4

A printed decorating paper having a weight of 80 g./m.$^2$ is impregnated on one side by a roller coating device with a 30% solution of a polyester composed of ethylene glycol radicals, neopentyl gycol radicals and terephthalic acid and isophthalic acid radicals, which contains ethylene glycol radicals and neopentyl glycol radicals in the molar ratio of 70:30 and terephthalic acid and isophthalic acid radicals in the molar ratio of 50:50, the uncoated paper surface being saturated to only 40 to 50%. A mixture of equal parts of xylene and butanone serves as the solvent.

Then follows the drying. The coating amounts to 25 to 28 grams of solid resin per square meter.

EXAMPLE 5

The paper impregnated according to Example 1 is laminated and textured on a fusion rolling machine with a glass-clear, soft PVC film 200 microns thick at 175 to 185° C.

The sheet materials thus manufactured can be cemented very well to chipboard, with good edge strength, by means of glues made on a basis, for example, of polyvinyl acetate or a urea-formaldehyde resin.

What is claimed is:

1. An article consisting of a paper impregnated with a saturated polyester having at least one hydroxyl moiety selected from the group consisting of ethylene glycol and neopentyl glycol, the carboxyl moiety of said polyester comprising a mixture of terephthalic acid and isophthalic acid in a mole ratio of about 70:30 to 30:70, said impregnated paper having a polyvinyl chloride coating thereon.

2. A composite article as claimed in claim 1, wherein said ethylene glycol and said neopentyl glycol are present in a mole ratio of about 90:10 to 60:40.

3. A composite article as claimed in claim 1 mounted on a substrate.

4. A composite article as claimed in claim 1, wherein said acid mole ratio is about 50:50.

5. A composite article as claimed in claim 1 wherein said polyvinyl chloride is plasticized.

References Cited

UNITED STATES PATENTS

| 2,849,359 | 8/1958 | Smith | 161—231 X |
| 2,892,747 | 6/1959 | Dye | 161—232 X |
| 2,961,365 | 11/1960 | Sroog | 161—232 X |
| 2,975,147 | 3/1961 | Abbott et al. | 117—155 X |
| 3,054,703 | 9/1962 | Brasure | 161—232 X |
| 3,085,920 | 4/1963 | Taylor et al. | 161—232 |

FOREIGN PATENTS 766,290  1/1957  Great Britain.

JOHN T. GOOLKASIAN, Primary Examiner

JOSEPH C. GIL, Assistant Examiner

U.S. Cl. X.R.

117—76, 155; 161—231